(12) United States Patent
Sahota et al.

(10) Patent No.: US 11,568,308 B2
(45) Date of Patent: Jan. 31, 2023

(54) CORRECTING BIAS IN SUPERVISED MACHINE LEARNING DATA

(71) Applicant: ROYAL BANK OF CANADA, Montreal (CA)

(72) Inventors: Jaspreet Sahota, Toronto (CA); Janahan Ramanan, Scarborough (CA); Yuanqiao Wu, Toronto (CA); Yik Chau Lui, Toronto (CA)

(73) Assignee: ROYAL BANK OF CANADA, Montreal (CA)

( * ) Notice: Subject to any disclaimer, the term of this patent is extended or adjusted under 35 U.S.C. 154(b) by 834 days.

(21) Appl. No.: 16/440,000

(22) Filed: Jun. 13, 2019

(65) Prior Publication Data
US 2019/0385079 A1  Dec. 19, 2019

Related U.S. Application Data

(60) Provisional application No. 62/684,451, filed on Jun. 13, 2018.

(51) Int. Cl.
*G06N 20/00* (2019.01)
*G06K 9/62* (2022.01)

(52) U.S. Cl.
CPC ......... *G06N 20/00* (2019.01); *G06K 9/6215* (2013.01); *G06K 9/6256* (2013.01)

(58) Field of Classification Search
CPC ..... G06N 20/00; G06K 9/6215; G06K 9/6256
See application file for complete search history.

*Primary Examiner* — Paul Danneman
(74) *Attorney, Agent, or Firm* — Norton Rose Fulbright Canada LLP

(57) ABSTRACT

An electronic device and method of correcting bias for supervised machine learning data is provided. The electronic device comprises a processor and memory storing instructions which when executed by the processor configure the processor to perform the method. The method comprises training an auto-encoder with an unbiased subset of historical data, and applying the auto-encoder to correct historical data.

14 Claims, 4 Drawing Sheets

CORRECTING BIAS IN SUPERVISED MACHINE LEARNING DATA

CROSS-REFERENCE TO RELATED APPLICATIONS

This application claims all benefit including priority to U.S. Provisional Patent Application 62/684,451, filed Jun. 13, 2018, and entitled: "Correcting Bias in Supervised Machine Learning Data," which is hereby incorporated by reference in its entirety.

FIELD

The present disclosure generally relates to the field of machine learning, and in particular to correcting bias in supervised machine learning data.

INTRODUCTION

Embodiments described herein relate to machine learning which is a field of computer science that configures computing devices to process data using programming rules and code that can dynamically update over time. Machine learning involves programming rules and code that can detect patterns and generate output data that represents predictions or forecasting. Sometimes, training data for supervised machine learning is mislabeled due to a bias in a protocol used to collect the data.

SUMMARY

In accordance with an embodiment, there is provided an electronic device for correcting bias for supervised machine learning data is provided. The electronic device comprises a processor and memory storing instructions which when executed by the processor to configure the processor to train an auto-encoder with an unbiased subset of historical data, and apply the neural network to correct historical data.

In accordance with another embodiment, there is provided a method of correcting bias for supervised machine learning data is provided. The method comprises training an auto-encoder with an unbiased subset of historical data, and applying the neural network to correct historical data.

In accordance with another embodiments, there is provided a non-transitory computer readable medium storing instructions which when executed by a processor configure the processor to perform a method of correcting bias in supervised machine learning data. The method comprises training a neural network with an unbiased subset of historical data, and applying the neural network to correct historical data.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DETAILED DESCRIPTION

Figure 1:
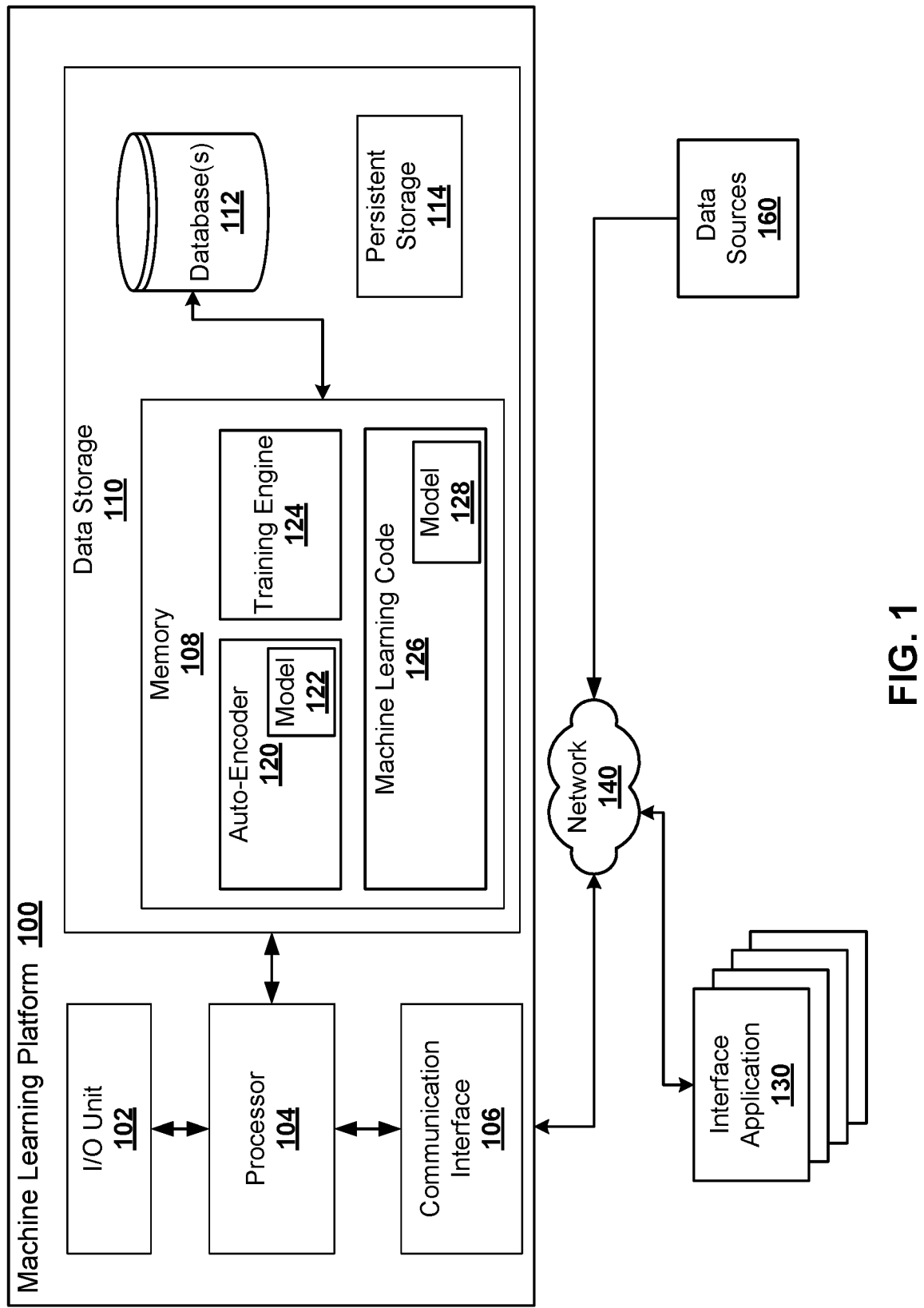
FIG. 1 illustrates, in a schematic diagram, an example of a physical environment for a machine learning platform, according to some embodiments.

Embodiments of methods, systems, and apparatus are described through reference to the drawings.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

In some embodiments, consumer/personal data is de-identified (e.g., altered to remove identifying credentials). The de-identification process can include intentionally introducing perturbations of data, deleting or masking personal identifiers (e.g., replacement with a hashed value), suppressing or generalizing quasi-identifiers, among others. The de-identification process can further include co-mingling and/or aggregation with other data, such that individual data cannot be discerned from a population level set of data, and where only the aggregated data is used for analysis. Example approaches for anonymization include pseudonymization, k-anonymization, among others. Consent for usage of data is typically requested in combination with purposes listed in various agreements and to enhance various systems and products.

A collections protocol may be used for contacting clients that have missed a past-due payment based on how risky a client is deemed to be (riskier clients are contacted sooner than less risky clients). Sometimes, this protocol leads to clients being contacted even in circumstances when it is not necessary because the client will make their missed payment irrespective of whether or not they are contacted. Clients who make missed payments irrespective of whether or not they are contacted are defined to be "self-cure" clients.

For the objective of predicting a self-cure client, a supervised machine learning model may be used. Such a model relies on correctly labelled training examples which specify which lending accounts (e.g., credit cards, car loans, line of credits, mortgages, etc.) have historically been self-cured and which have not. More explicitly, the input data for such a supervised machine learning model comprises account level information along with labels which classify each historical account as "self-cure" or "not self-cure". Such training data can be used to train a supervised machine learning model so that it can reliably predict the probability of a self-cure event or status for future new accounts that will enter collections.

In order to create such a supervised machine learning model that would predict self-cure events or statuses, correctly labelled (self-cure vs. not self-cure) training data at the account level is used. However, such data may not exist because many clients are contacted too early by collections due to a current protocol. Therefore, many clients are not given the opportunity to self-cure. As a result, a client that might have been a self-cure candidate would show up in the historical dataset as not being a self-cure candidate simply because they were contacted by the lender before they had an opportunity to pay.

FIG. 1 illustrates, in a schematic diagram, an example of a physical environment for a machine learning platform 100, according to some embodiments. The platform 100 may be an electronic device connected to interface application 130 and data sources 160 via network 140. The platform 100 can implement aspects of the processes described herein for correcting bias in supervised machine learning data. Supervised machine learning data may sometimes be mislabeled which leads to a bias in a neural network output.

The platform 100 may include a processor 104 and a memory 108 storing machine executable instructions to configure the processor 104 to receive a neural network (from e.g., data sources 160). The processor 104 can receive a trained neural network and/or can train a neural network using training engine 124. The platform 100 can include an I/O Unit 102, communication interface 106, and data storage 110. The processor 104 can execute instructions in memory 108 to implement aspects of processes described herein.

The platform 100 may be implemented on an electronic device and can include an I/O unit 102, a processor 104, a communication interface 106, and a data storage 110. The platform 100 can connect with one or more interface devices 130 or data sources 160. This connection may be over a network 140 (or multiple networks). The platform 100 may receive and transmit data from one or more of these via I/O unit 102. When data is received, I/O unit 102 transmits the data to processor 104.

The I/O unit 102 can enable the platform 100 to interconnect with one or more input devices, such as a keyboard, mouse, camera, touch screen and a microphone, and/or with one or more output devices such as a display screen and a speaker.

The processor 104 can be, for example, any type of general-purpose microprocessor or microcontroller, a digital signal processing (DSP) processor, an integrated circuit, a field programmable gate array (FPGA), a reconfigurable processor, or any combination thereof.

The data storage 110 can include memory 108, database (s) 112 and persistent storage 114. Memory 108 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 110 can include memory 108, databases 112 (e.g., graph database), and persistent storage 114.

The communication interface 106 can enable the platform 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The platform 100 can be operable to register and authenticate users (using a login, unique identifier, and password for example) prior to providing access to applications, a local network, network resources, other networks and network security devices. The platform 100 can connect to different machines or entities.

The data storage 110 may be configured to store information associated with or created by the platform 100. Storage 110 and/or persistent storage 114 may be provided using various types of storage technologies, such as solid state drives, hard disk drives, flash memory, and may be stored in various formats, such as relational databases, non-relational databases, flat files, spreadsheets, extended markup files, etc.

In some embodiments, the auto-encoder 120 (e.g., a six layer deep neural network) may be used to learn which of the potentially mislabeled clients were in fact self-cure clients. This may be done by training the auto-encoder 120 to recognize features that correspond to self-cure clients by training this network on an unbiased subset of the historical data. Unbiased self-cure accounts are accounts that self-cured before a specific day (e.g., before day 21 for credit card accounts—this example threshold may be selected based on when a lender is required to contact the client irrespective of their risk score). In contrast, unbiased not self-cure accounts are accounts that required more than the specified days (threshold determined by product type) to cure (make payments). Therefore, the unbiased data results in definite self-cure accounts and definite not self-cure accounts can be used to train the unsupervised auto-encoder 120. After such training, the auto-encoder 120 can be used to correct the entire historical (training) data for the supervised machine learning model 128. The model 128 may then be trained on the bias-corrected data.

Figure 2:
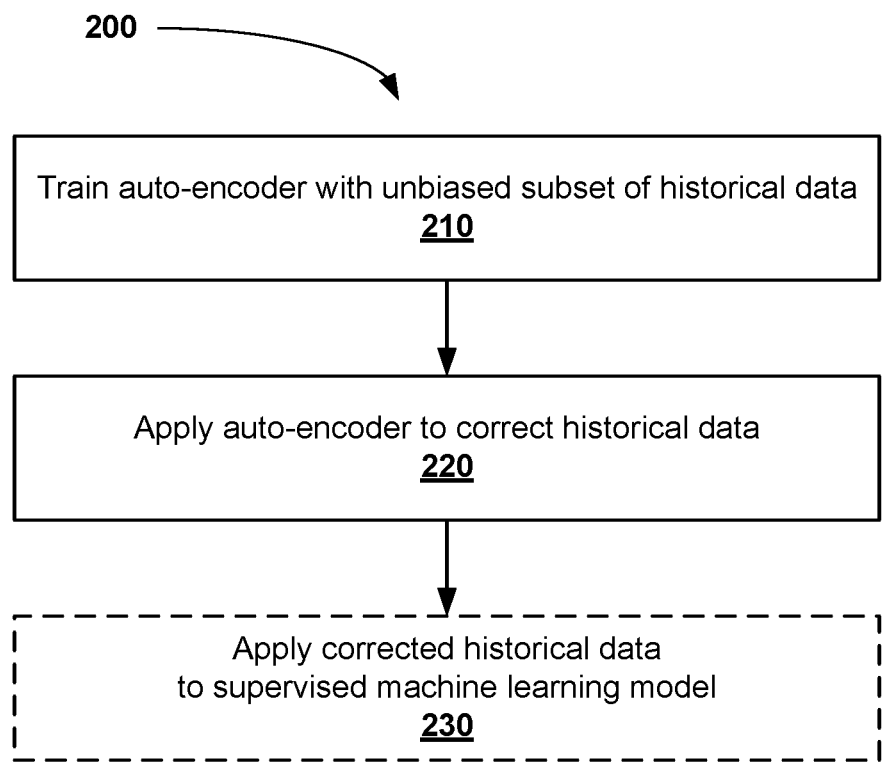
FIG. 2 illustrates, in a flowchart, an example of a method of correcting bias in data, in accordance with some embodiments.

FIG. 2 illustrates, in a flowchart, an example of a method of correcting bias in data 200, in accordance with some embodiments. The method 200 comprises training 210 an auto-encoder 120 with an unbiased subset of historical data. Next, the auto-encoder 120 may be applied 220 to correct the historical data. Optionally, the corrected historical data may be applied 230 to train a supervised machine learning model 228. Other steps may be added to the method 200.

In some embodiments, an auto-encoder 120 may be injected with the features of an unbiased subset of historical data. The object of such a model 122 is to encode the input features into a lower dimension and then reconstruct the full (or as full as possible) set of features from this compressed representation. The objective function (loss function of the auto-encoder 120) may be set to maximize the difference between $L_0$ and $L_1$, where $L_0$ is the distance between input feature and output features for not self-cure accounts, and $L_1$ is the distance between input feature and output features for self-cure accounts.

In some embodiments, the objective function comprises a contrastive loss function, defined on an unbiased subset of the data. Self-cure samples (i.e., sample from the positive class) from this unbiased subset are used to define $L_1$, which is the reconstruction loss:

$$L_1 = \frac{1}{N_1} \sum_{i=1}^{N_1} \|\hat{X}_1^{(i)} - X_1^{(i)}\|^2,$$

where $\hat{X}_1^{(i)}$ is the reconstructed feature (output of auto-encoder 120), and $\hat{X}_1^{(i)}$ is the input to the auto-encoder 120. The subscript denotes the class (positive=1 and negative=0); whereas, the superscript (i) denotes the sample number. In addition, $N_1$ denotes the total number of positive samples from the unbiased data. Likewise, the reconstruction loss of the negative samples (not self-cure samples) from the unbiased data is:

$$L_0 = \frac{1}{N_0} \sum_{i=1}^{N_0} \|\hat{X}_0^{(i)} - X_0^{(i)}\|^2.$$

Following the notation above, $\hat{X}_0^{(i)}$ is the reconstructed feature (output of auto-encoder 120), $\hat{X}_0^{(i)}$ is the input to the auto-encoder 120, and $N_0$ denotes the total number of positive samples from the unbiased data. The overall objective function is $L_1$-$L_0$, defined on an unbiased subset of the training data.

As a result, after the auto-encoder 120 is trained 210 (i.e., the objective function has been optimized), the auto-encoder 120 may classify the potentially biased account of the historical data as self-cure or not self-cure. This results in correcting 220 bias in the historical data. Therefore, the auto-encoder 120 categorizes the input data into self-cure and not self-cure by leveraging the unbiased labels from historical data. The corrected historical dataset may then be used to train 230 a supervised machine learning model (as described above) for the purpose of predicting the probability of self-curing for each account that enters collections.

It should be understood that the Euclidian norm in the calculation of $L_1$ or $L_0$, i.e., $\|\hat{X}_1^{(i)} - \hat{X}_1^{(i)}\|$, may be replaced by a cross-entropy or other suitable normalization function. In some embodiments, $\hat{X}_1^{(i)}$ may comprise a row in a table of data. For example, a table may be used to represent customer accounts where each row represents a different account and each column represents a different attribute for the accounts. Pre-processing functions may be applied the data in the table to standardize the data and fill in missing values. Once the data is pre-processed, each row $\hat{X}_1^{(i)}$ in the table may be entered into the auto-encoder 120 (together with its correct label value representing "self-cure" or "not self-cure") and normalized using an objective function (e.g., objective loss functions $L_1$ or $L_0$ described above). As the auto-encoder 120 receives more data, the auto-encoder 120 may reduce the number of dimensions in the data (e.g., reduce rows, merge rows, etc.) and then reconstruct each row $\hat{X}_1^{(i)}$ in the table. Through machine learning, the auto-encoder 120 may learn patterns and determine function coefficients and weights to minimize the overall objective loss function as in a gradient descent scheme.

In some embodiments, bias may be present in a label of data. For example, accounts that are labelled as "self-cure" or "not-self-cure" may be labelled correctly or incorrectly. Correctly labelled accounts (both "self-cure" and "not-self-cure") may be used by the auto-encoder 120 to determine contrasting values for $L_1$ and $L_0$ for correcting bias in historical data. Once the auto-encoder 120 is trained using a correct subset of data to determine if an account is a "self-cure" or "not-self-cure" account, then the auto-encoder 120 may be used to label or re-label all historical data. Thus, in some embodiments, the teachings herein show how to use a subset of data known to be correct to determine contrasted loss function results for two different classes of the data, and then use the determined contrasted loss function results to correct and/or label class labels for all (or another subset) of the historical data.

In some embodiments, the know subset of historical data may be determined using a binary classifier. For example, a logistic regression analysis or simply neural network may be applied to the historical data to determine a confidence level for each label (i.e., a confidence level for whether an account is correctly labeled as "self-cure" or "not-self-cure"). Labels over a certain threshold of confidence may be used as the know "correct" subset of historical data to train the auto-encoder 120.

Figure 3:
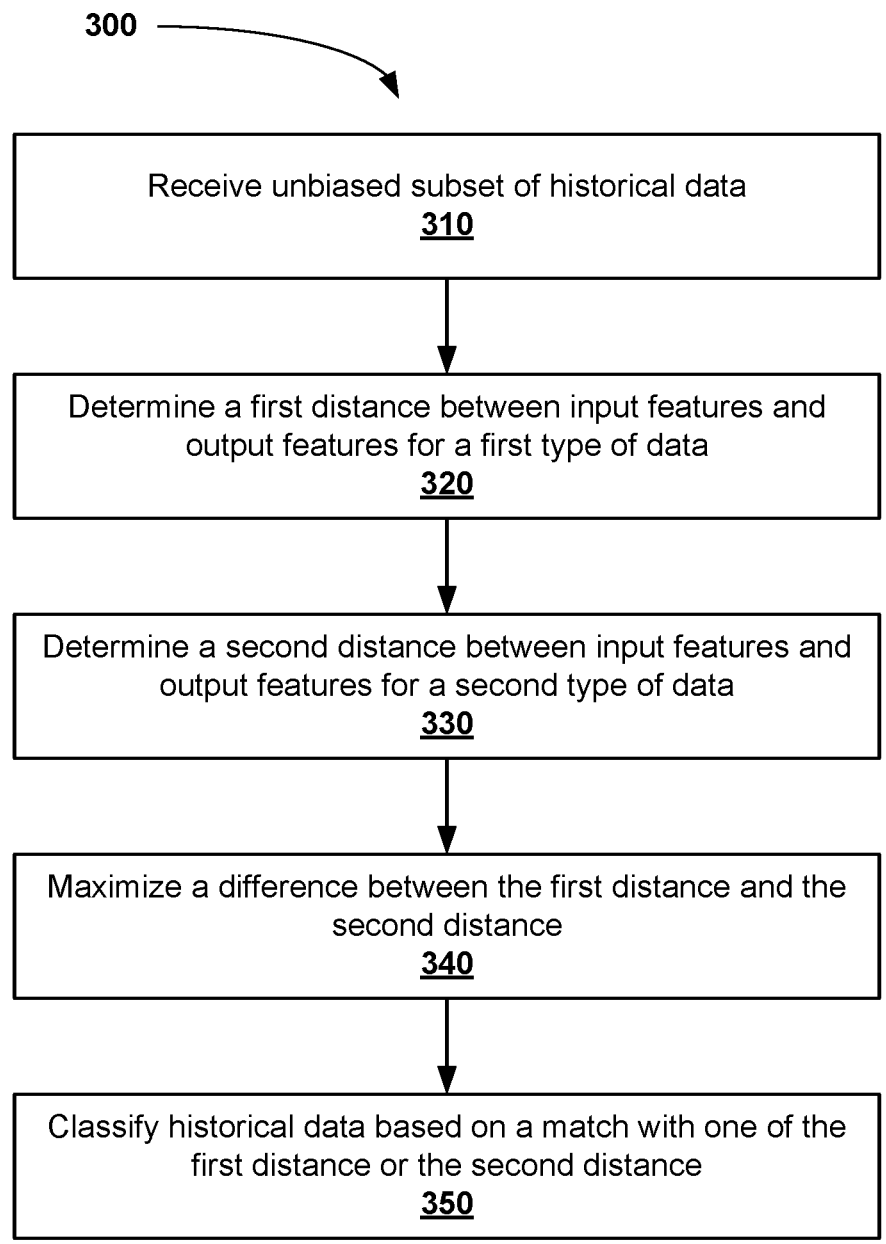
FIG. 3 illustrates, in a flowchart, another example of a method of correcting bias in data, in accordance with some embodiments.

FIG. 3 illustrates, in a flowchart, another example of a method of correcting bias in data 300, in accordance with some embodiments. The method 300 may be performed by an auto-encoder 120. The method 300 comprises receiving 310 an unbiased subset of historical data. Next, the auto-encoder 120 may determine 320 a first distance between input features and output features for a first type of data (e.g., "not self-cure" accounts). Next, the auto-encoder 120 may determine 330 a second distance between input features and output features for a second type of data (e.g., "self-cure" accounts). In some embodiments, the determinations of the first and second distances may be the distances between input features and output features as applied to a loss function or other objective function of the auto-encoder 120. Input features and the objective function may be selected based on a maximization between the first distance and the second distance. I.e., the auto-encoder 120 may carryout calculations for several input samples and objective function combinations, determine which model weights produces output features that maximize the difference between the first distance and the second distance. In some embodiments, the auto-encoder 120 may try different objective functions and determine an optimal function to use to optimize $L_0$ and $L_1$. For example, $L_1$ and $L_0$ could be the cross-entropy between input and output instead of Euclidian distance. Once optimal auto-encoder weights are determined, the resulting model can be applied to the input features for the historical data to classify the historical data (e.g., accounts) into either the first class (i.e., a "not self-cure" value) or the second class (i.e., a "self-cure" value). Thus, the historical data is classified 350 based on a match with one of the first distance or the second distance, i.e., by computing the value of $\|\hat{X}^{(i)} - X^{(i)}\|$ and using its magnitude to determine class: a large value implies class 0 and a small value implies class 1. The threshold of determining "small vs. large" is determined as a hyperparameter of a validation set. Other steps may be added to the method 300.

Figure 4:
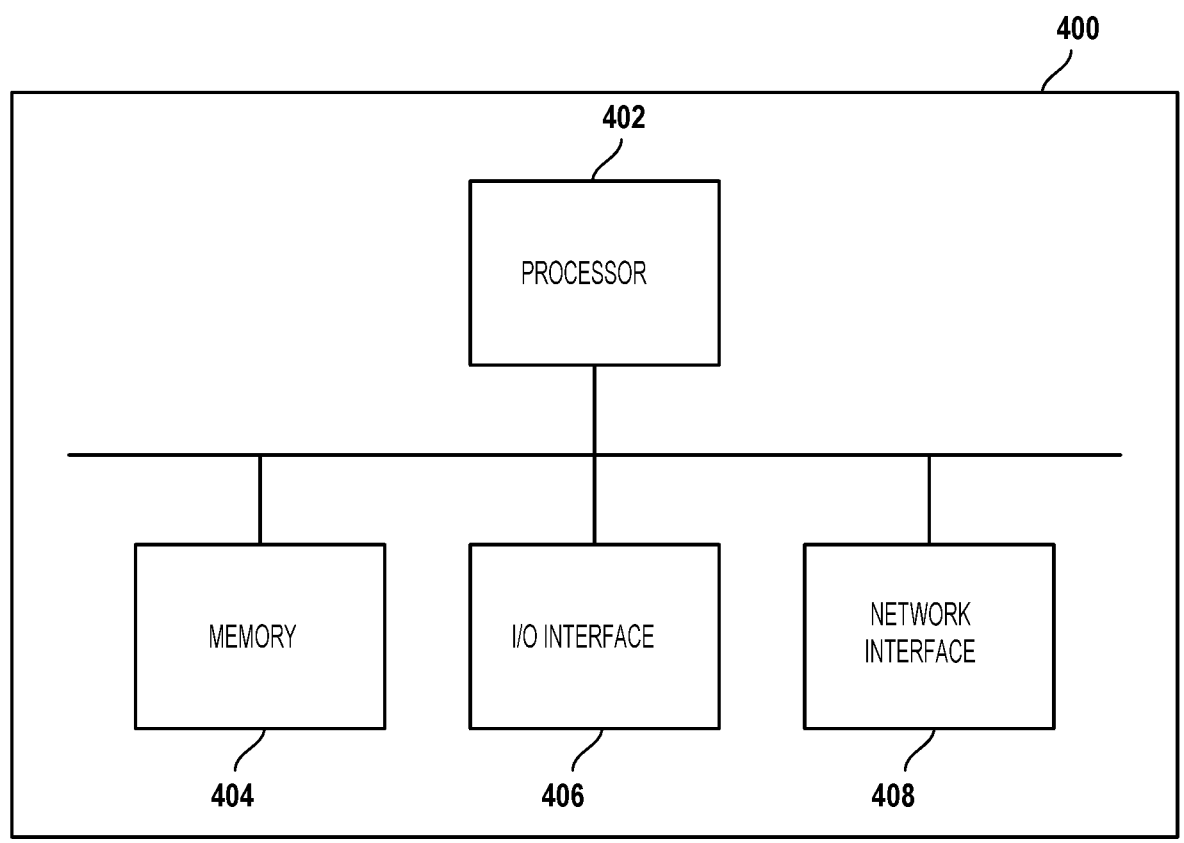
FIG. 4 is a schematic diagram of a computing device such as a server.

FIG. 4 is a schematic diagram of a computing device 400 such as a server. As depicted, the computing device includes at least one processor 402, memory 404, at least one I/O interface 406, and at least one network interface 408.

Processor 402 may be an Intel or AMD x86 or x64, PowerPC, ARM processor, or the like. Memory 404 may include a suitable combination of computer memory that is located either internally or externally such as, for example, random-access memory (RAM), read-only memory (ROM), compact disc read-only memory (CDROM).

Each I/O interface 406 enables computing device 400 to interconnect with one or more input devices, such as a keyboard, mouse, camera, touch screen and a microphone, or with one or more output devices such as a display screen and a speaker.

Each network interface 408 enables computing device 400 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WiMAX), SS7 signaling network, fixed line, local area network, wide area network, and others.

The forgoing discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. An electronic device for correcting bias for supervised machine learning data, the electronic device comprising a processor and memory storing instructions which when executed by the processor configure the processor to:
   train an auto-encoder with an unbiased subset of historical data, wherein the processor is configured to:
      receive the unbiased subset of historical data;
      determine a first distance between input features and output features for a first type of data using a plurality of input samples and objective function combinations;
      determine a second distance between input features and output features for a second type of data using a plurality of input samples and objective function combinations;
      compare and determine an optimal objective function and input feature combination that maximizes the difference between first and second distances; and
      classify the historical data based on a match with one of the first distance or the second distance as applied to the optimal objective function; and
   apply the auto-encoder to correct historical data, wherein the auto-encoder is configured to:
      apply the optimal objective function to input features of the historical data; and
      correct or re-label the historical data based on the applied optimal objective function.

2. The electronic device as claimed in claim 1, wherein to train said auto-encoder, the processor is configured to:
   retrieve the unbiased subset of historical data; and
   extract features from the unbiased subset of historical data.

3. The electronic device as claimed in claim 2, wherein to extract features, the processor is configured to:
   encode input features into a lower dimension; and
   reconstruct a set of features from the encoded input features.

4. The electronic device as claimed in claim 3, wherein, to encode input feature, the processor is configured to:
   determine a first distance between an input feature and output features for a not self-cure account;
   determine a second distance between an input feature and output features for a self-cure account; and
   maximizing a difference between the first distance and the second distance.

5. The electronic device as claimed in claim 4, wherein, to apply the auto-encoder to correct historical data, the processor is configured to:
   classify potentially biased data into one of a "not self-cure" value or a "self-cure" value based on a match with one of the first distance or the second distance.

6. The electronic device as claimed in claim 1, wherein the processor is configured to:
apply the corrected historical data to a supervised machine learning model.

7. A computer-implemented method of correcting bias in supervised machine learning data, the method comprising:
training, at a processor, an auto-encoder with an unbiased subset of historical data, comprising:
receiving, at the processor, the unbiased subset of historical data;
determining, at the processor, a first distance between input features and output features for a first type of data using a plurality of input samples and objective function combinations;
determining, at the processor, a second distance between input features and output features for a second type of data using a plurality of input samples and objective function combinations;
comparing and determining, at the processor, an optimal objective function and input feature combination that maximizes the difference between first and second distances; and
classifying, at the processor, the historical data based on a match with one of the first distance or the second distance as applied to the optimal objective function; and
applying, at the processor, the auto-encoder to correct historical data, comprising:
applying the optimal objective function to input features of the historical data; and
correcting or relabeling the historical data based on the applied optimal objective function.

8. The computer-implemented method as claimed in claim 7, wherein training said auto-encoder comprises:
retrieving, at the processor, the unbiased subset of historical data; and
extracting, at the processor, features from the unbiased subset of historical data.

9. The computer-implemented method as claimed in claim 8, wherein extracting said features comprises:
encoding input features into a lower dimension; and
reconstructing a set of features from the encoded input features.

10. The computer-implemented method as claimed in claim 9, wherein encoding the input feature comprises:
determining a first distance between an input feature and output features for a not self-cure account;
determining a second distance between an input feature and output features for a self-cure account; and
maximizing a difference between the first distance and the second distance.

11. The computer-implemented method as claimed in claim 10, where applying the auto-encoder to correct historical data comprises:
classifying potentially biased data into one of a "not self-cure" value or a "self-cure" value based on a match with one of the first distance or the second distance.

12. The computer-implemented method as claimed in claim 7, comprising:
applying the corrected historical data to a supervised machine learning model.

13. A non-transitory computer readable medium storing instructions which when executed by a processor configure the processor to perform a method of correcting bias in supervised machine learning data, the method comprising:
training, at a processor, an auto-encoder with an unbiased subset of historical data, comprising:
receiving, at the processor, the unbiased subset of historical data;
determining, at the processor, a first distance between input features and output features for a first type of data using a plurality of input samples and objective function combinations;
determining, at the processor, a second distance between input features and output features for a second type of data using a plurality of input samples and objective function combinations;
comparing and determining, at the processor, an optimal objective function and input feature combination that maximizes the difference between first and second distances; and
classifying, at the processor, the historical data based on a match with one of the first distance or the second distance as applied to the optimal objective function; and
applying, at the processor, the auto-encoder to correct historical data, comprising:
applying the optimal objective function to input features of the historical data; and
correcting or relabeling the historical data based on the applied optimal objective function.

14. The non-transitory computer readable medium as claimed in claim 13, wherein the method comprises:
applying the corrected historical data to a supervised machine learning model.

* * * * *